United States Patent
Paasikallio et al.

(10) Patent No.: US 11,708,536 B2
(45) Date of Patent: Jul. 25, 2023

(54) METHOD FOR REDUCING FOULING IN CATALYTIC CRACKING

(71) Applicant: NESTE OYJ, Espoo (FI)

(72) Inventors: Ville Paasikallio, Porvoo (FI); Blanka Toukoniitty, Porvoo (FI); Jukka-Pekka Pasanen, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 16/959,034

(22) PCT Filed: Dec. 20, 2018

(86) PCT No.: PCT/EP2018/086112
§ 371 (c)(1),
(2) Date: Jun. 29, 2020

(87) PCT Pub. No.: WO2019/129626
PCT Pub. Date: Jul. 4, 2019

(65) Prior Publication Data
US 2020/0339895 A1 Oct. 29, 2020

(30) Foreign Application Priority Data

Dec. 29, 2017 (FI) .................................... 20176186

(51) Int. Cl.
| C10G 69/04 | (2006.01) |
| C10G 75/00 | (2006.01) |
| C10L 1/04 | (2006.01) |

(52) U.S. Cl.
CPC ............. *C10G 69/04* (2013.01); *C10G 75/00* (2013.01); *C10L 1/04* (2013.01); *C10G 2300/1007* (2013.01); *C10G 2300/1011* (2013.01); *C10G 2300/4081* (2013.01); *C10G 2400/02* (2013.01)

(58) Field of Classification Search
CPC .............. C10G 11/00–22; C10G 69/04; C10G 2300/1007; C10G 2300/1011–1018
See application file for complete search history.

(56) References Cited

U.S. PATENT DOCUMENTS

| 4,033,859 A | 7/1977 | Davidson et al. |
| 4,512,878 A | 4/1985 | Reid et al. |
| 4,941,967 A | 7/1990 | Mannetje et al. |

(Continued)

FOREIGN PATENT DOCUMENTS

| CN | 101475870 A | * 7/2009 | .......... C10M 175/00 |
| CN | 102206502 A | 10/2011 | |

(Continued)

OTHER PUBLICATIONS

English machine translation of CN 101475870A, obtained from Google Patents. (Year: 2009).*

(Continued)

*Primary Examiner* — Renee Robinson
(74) *Attorney, Agent, or Firm* — Buchanan Ingersoll & Rooney PC (57) ABSTRACT

A method is disclosed for reducing fouling in catalytic cracking. The method includes subjecting a recycled fossil-based feedstock to a heat treatment, evaporating the heat-treated feedstock, hydrotreating resulting evaporation distillate and performing catalytic cracking of the hydrotreated distillate in a presence of a solid acid catalyst.

18 Claims, 3 Drawing Sheets

(56) References Cited

U.S. PATENT DOCUMENTS

| | | | |
|---|---|---|---|
| 5,049,258 A | 9/1991 | Keim et al. | |
| 2013/0145683 A1 | 6/2013 | Freel et al. | |
| 2014/0115952 A1* | 5/2014 | Wang | B01J 8/1818 |
| | | | 44/307 |
| 2014/0251869 A1 | 9/2014 | Macdonald | |
| 2016/0130510 A1* | 5/2016 | Wombles | B01D 3/10 |
| | | | 208/184 |

FOREIGN PATENT DOCUMENTS

| | | |
|---|---|---|
| CN | 104194818 A | 12/2014 |
| WO | 2011112661 A2 | 9/2011 |

OTHER PUBLICATIONS

F. Audibert, "Oil Composition and the Required Treatment Steps" Waste Engine Oils, Chapter 3, pp. 35-89.

F. Audibert, "Alternative Valorization Routes (Refinery, Cogeneration, and Rerefining Residue)" Waste Engine Oils, Chapter 6, pp. 247-269.

International Search Report and Written Opinion issued in corresponding International Patent Application No. PCT/2018//086112, 10 pages (dated Feb. 22, 2019).

Office Action issued in corresponding Finnish Patent Application No. 20176186, 5 pages (dated Apr. 3, 2020).

Office Action issued in corresponding Finnish Patent Application No. 20176186, 7 pages (dated May 3, 2018).

Office Action (Opinion on Patentability) dated May 18, 2021, by the Singaporean Patent Office in corresponding Singaporean Patent Application No. 11202005742T. (9 pages).

Office Action (Invitation to Respond to Written Opinion) dated Apr. 28, 2021, by the Finnish Patent Office in corresponding Finnish Patent Application No. 20176186. (4 pages).

Office Action dated Jun. 11, 2021, by the Canadian Patent Office in corresponding Canadian Patent Application No. 3,084,708. (4 pages).

First Office Action dated Aug. 25, 2021, by the Chinese Patent Office in corresponding Chinese Patent Application No. 201880084426. 6, and an English Translation of the Office Action. (15 pages).

Office Action dated Nov. 25, 2021, by the Chinese Patent Office in corresponding Chinese Patent Application No. 201880084426.6. (5 pages).

Notice of Allowance dated Jan. 18, 2022, by the Canadian Patent Office in corresponding Canadian Patent Application No. 3,084,708. (1 page).

Office Action dated Mar. 15, 2022, by the Chinese Patent Office in corresponding Chinese Patent Application No. 201880084426.6, and a partial English Translation of the Office Action. (7 pages).

Office Action dated Sep. 9, 2022, by the Brazilian Patent Office in corresponding Brazilian Patent Applicatior No. BR112020013343-4, and an English Translation of the Office Action. (8 pages).

\* cited by examiner

METHOD FOR REDUCING FOULING IN CATALYTIC CRACKING

TECHNICAL FIELD

The present invention relates to a catalytic cracking method, a fuel component obtainable by the method and the product obtainable by the method.

TECHNICAL BACKGROUND

Mobility and logistics are an essential part of life, economy and society today. To meet the growing energy needs of traffic and transport it is important to seek sustainable fuel solutions. Decarbonizing the transport sector is a major challenge and fossil fuels should slowly be replaced by more sustainable fuels. Liquid fuel has benefits compared to gases and electricity in traffic solutions due to existing infrastructure and fuel logistics. The energetic content of liquid fuels is also superior, which is essential since energy needs to be carried on-board in vehicles.

In addition to biofuels, there is increasing interest towards utilizing recycled fossil-based materials such as used lubricant oils (ULO) or other waste oils for production of transportation fuels. In contrast to most biomass-derived liquids, ULO and other fossil waste oils have a distinct benefit of containing very little oxygen. On the other hand, ULO and other waste oils do contain a plurality of other impurities (metals, phosphorus, silicon, chlorine) which originate primarily from the additives that have been used in the production process. However, the hydrocarbons that are contained in recycled fossil-based materials such as ULO and other waste oils are largely paraffinic, and they fall within a boiling point range that is suitable for catalytic cracking. Waste oils such as these therefore offer an alternative for conventional cracking feeds like vacuum gas oil (VGO).

Furthermore, starting from 2020 in the European Union, the new renewable energy directive (RED II) may include some form of incentives for transportation fuels prepared from fossil-based recycled feeds. Thus, even though ULO and other waste oils are a highly challenging feedstock in terms of purification, they are regarded as an alternative refinery feed with good potential. One method for purification of waste oils is distillation; it simultaneously separates most of the metallic impurities/phosphorus and the heaviest hydrocarbons into the distillation bottoms, thus rendering the resulting distillates into a more readily utilizable form.

An alternative use for ULO is to re-refine the hydrocarbons into base oil components, and subsequently use them in the formulation of new lubricants. In this application, it is essential to avoid the cracking of base oil hydrocarbon chains during purification of ULO. Because of this, distillation technologies which are particularly suitable for thermally unstable materials are often utilized for fractionating ULO. One example of such a technology is thin film evaporation (TFE). In addition to distillation, another purification operation such as catalytic hydrotreating or solvent extraction is also needed. ULOs are highly complex mixtures and some of the components in them can react when subjected to elevated temperatures. Conventional techniques for recovering recycled fossil-based materials therefore kept the thermal impact of the recycling treatment as low as possible. Usually, thin film evaporators which work at relatively low temperature, reduced pressure and short contact times have been employed.

F. Audibert, "Waste Engine Oils", 1st Edition, 2006, Elsevier, ISBN 9780444522023 P2 discloses that waste oil (used engine oil) can be treated by a number of methods so as to be suitable for further use. For example, catalytic cracking (preceded by distillation), acid treatment and heat treatment are mentioned as possible methods.

Further, U.S. Pat. No. 4,512,878 A discloses a method for recycling waste oils comprising a heat soaking step, a distillation step and a hydrotreating step.

SUMMARY OF THE INVENTION

It is an object of the present invention to provide an improved method for treatment of recycled fossil-based materials.

The inventors of the present invention surprisingly found that reactions taking place during evaporation (distillation) may impact how recycled fossil-based materials, such as ULO and other waste oils, behaves in subsequent process steps, such as a hydrotreatment step and in particular in a catalytic cracking step. That is, if this material is still highly reactive after the evaporation step, it may undergo unwanted reactions in the hydrotreatment step and/or the catalytic cracking step, which can consequently lead to e.g. fouling and plug formation. The surprising finding of the present invention is specifically that the highly reactive materials are not removed together with the residue fraction of the evaporation stage, but a considerable amount thereof ends up in the distillate fractions.

The inventors then found that the negative impacts of such reactive materials on a subsequent step (in particular on a cracking step) can be reduced or eliminated by performing a heat treatment before finishing the evaporation step.

The present invention is defined in the independent claims. Further beneficial embodiments are set forth in the dependent claims. Specifically, the present invention relates to one or more of the following items:

1. A method comprising the following steps:
   subjecting a recycled fossil-based feedstock to a heat treatment, evaporating the heat-treated feedstock to produce a distillate and a residue fraction,
   hydrotreating the distillate to produce a hydrotreated distillate,
   performing catalytic cracking of the hydrotreated distillate as a feed component in the presence of a solid acid catalyst,
   wherein the heating temperature during the heat treatment step is at least 290° C. and wherein the heat treatment step is carried out for at least 1 minute.
2. The method according to item 1, wherein the recycled fossil-based feedstock is liquid at 25° C.
3. The method according to item 1 or 2, further comprising a pre-treatment step of de-watering the recycled fossil-based feedstock.
4. The method according to any one of items 1 to 3, wherein the temperature during de-watering is lower than the (highest) temperature in the evaporation step.
5. The method according to any one of items 1 to 4, wherein the feed of the catalytic cracking step comprises a biomass-based feed component in addition to the hydrotreated distillate.
6. The method according to any one of items 1 to 5, wherein the feed of the catalytic cracking step comprises a fossil feed component in addition to the hydrotreated distillate.
7. The method according to any one of items 1 to 6, further comprising a step of removing insoluble components before performing catalytic cracking, wherein the step of removing solid components is preferably carried out after the heat treatment.

8. The method according to item 7, wherein the step of removing insoluble components comprises at least one of centrifugation, filtration, and sedimentation, preferably at least centrifugation.

9. The method according to any one of items 1 to 6, wherein no dedicated step of removing insoluble components, such as centrifugation or filtration, is carried out.

10. The method according to any one of items 1 to 9, wherein the heat treatment is carried out prior to the evaporation step.

11. The method according to any one of items 1 to 10, wherein the evaporation step is carried out by distillation, e.g. in a distillation column or in a fractionation tower.

12. The method according to any one of items 1 to 13, wherein the highest temperature in the evaporation step is 420° C. or less, preferably 410° C. or less, 400° C. or less, 380° C. or less, 360° C. or less, 340° C. or less, 320° C. or less, 310° C. or less, 300° C. or less, 290° C. or less or 280° C. or less.

13. The method according to any one of items 1 to 12, wherein the heat treatment is carried out as a part of the evaporation step.

14. The method according to item 13, wherein the evaporation step does not employ a fast evaporation technique, in particular a thin film evaporation technique.

15. The method according to any one of items 1 to 12, wherein the evaporation step is carried out in a fast evaporation apparatus, such as a thin film evaporator, a flash evaporator, a short path evaporator, a plate molecular still, or a falling film evaporator.

16. The method according to any one of items 1 to 15, wherein no hydrogen gas is fed in the cracking step.

17. The method according to any one of items 1 to 16, wherein the step of evaporating the heat-treated feedstock is carried out so as to produce at least two distillates (distillate fractions) and a residue fraction.

18. The method according to any one of items 1 to 17, wherein only a fraction of the distillate boiling at or above 100° C. under atmospheric pressure is subjected to the hydrotreatment step to produce the hydrotreated distillate.

19. The method according to any one of items 1 to 17, wherein only a fraction of the distillate boiling at or above 200° C., more preferably at or above 220° C., at or above 240° C., at or above 260° C., at or above 280° C., at or above 300° C., at or above 320° C., at or above 340° C., at or above 350° C., or at or above 360° C. under atmospheric pressure is subjected to the hydrotreatment step to produce the hydrotreated distillate.

20. The method according to any one of items 1 to 19, wherein the heating temperature during the heat treatment step is at least 300° C., preferably at least 310° C., at least 320° C., at least 330° C., at least 340° C., at least 350° C., at least 360° C., at least 370° C., at least 380° C., at least 390° C., at least 400° C., at least 410° C., at least 420° C., or at least 430° C.

21. The method according to any one of items 1 to 20, wherein the heat treatment step is carried out for at least 2 minutes, preferably at least 5 minutes, at least 10 minutes, at least 20 minutes, at least 30 minutes, at least 40 minutes, at least 50 minutes, at least 60 minutes, at least 80 minutes or at least 100 minutes.

22. The method according to any one of items 1 to 21, wherein the heat treatment step is carried out for 100 hours or less, preferably 50 hours or less, 40 hours or less, 30 hours or less, 20 hours or less, 10 hours or less, or 5 hours or less.

23. The method according to any one of items 1 to 22, wherein the heat treatment step is carried out at a pressure of 1.0 bar or more, preferably 1.2 bar or more, 1.5 bar or more, 2.0 bar or more or 3.0 bar or more.

24. The method according to any one of items 1 to 23, further comprising a step of fractionating the catalytic cracking product.

25. The method according to any one of items 1 to 24, wherein the solid acid catalyst is a particulate catalyst and/or a zeolite-based catalyst.

26. A fuel component obtainable by the method according to any one of items 1 to 25.

27. The fuel component according to item 26, comprising a fraction of the cracking product.

28. The fuel component according to item 26, comprising a fraction of the cracking product boiling in the gasoline range.

29. The fuel component according to item 26, comprising a fraction of the cracking product boiling in the middle distillate range.

30. A use of a cracking product or of a fraction thereof obtained by the method according to any one of items 1 to 25 for producing a fuel or a fuel component.

DETAILED DESCRIPTION OF THE INVENTION

The invention is now explained in detail with reference to specific embodiments. It is to be noted that any feature of the embodiments may be combined with any feature of another embodiment provided that such a combination does not result in a contradiction.

The present invention relates to a method for reducing fouling in catalytic cracking, the method comprising the steps of subjecting a recycled fossil-based feedstock to a heat treatment, evaporating the heat-treated feedstock to produce a distillate and a residue fraction, hydrotreating the distillate to produce a hydrotreated distillate, and performing catalytic cracking of the hydrotreated distillate as a feed component in the presence of a solid acid catalyst.

The present inventors surprisingly found that the combination of heat treatment, evaporation and hydrotreatment results in a significant reduction of the fouling tendency in a catalytic cracking reactor. Although it is not desired to be bound to theory, it is assumed that the heat treatment causes reactive components in the recycled fossil-based material to undergo a reaction and thus to end up as a part of the residue fraction of the evaporation. It is held that these components are responsible for coke formation (fouling) in the catalytic cracking step. In addition, the heat treatment was surprisingly found to increase the metal removal efficiency in the evaporation step. Further, it is assumed that the hydrotreatment efficiently removes remaining components (e.g. sulphur compounds) which may cause fouling in catalytic cracking or cause other problems downstream and that the combination of heat treatment and hydrotreatment (with evaporation in-between) achieves fouling prevention which exceeds the contribution of the individual measures taken alone.

In the present invention, evaporation means any suitable means to separate components of the recycled fossil-based feedstock into at least two fractions (at least one distillate and at least one residue) owing to different boiling points (or boiling point ranges) of the respective fractions. The evaporation residue specifically refers to the bottom product (heavy fraction) whereas the distillate refers to at least one of the evaporated fractions (light fraction). The evaporation may be carried out under ambient pressure or under reduced pressure.

The recycled fossil-based feedstock of the present invention includes any material of fossil origin which is collected after its primary use. The recycled fossil-based feedstock may comprise waste oil, such as used lubricant oil (ULO). Specifically, waste oils include any fossil (mineral based) lubrication or industrial oils which have become unfit for the use for which they were originally intended and in particular used combustion engine oils and gearbox oils and also mineral lubricating oils, oils for turbines and hydraulic oils.

The recycled fossil-based feedstock is preferably liquid at 25° C. Thus, the feedstock can be easily handled and does not require excessive heating during storage and/or transportation.

The distillate referred to in the present invention may be the only distillate of the evaporation (i.e. the evaporation results only in one distillate) or may be a distillate fraction. Specifically, the step of evaporating the heat-treated feedstock may be carried out so as to produce at least two distillates (distillate fractions) and a (at least one) residue fraction. In the latter case, the distillate may be a side product or a heads product.

Further, the evaporation may be carried out in more than one stage so that at least three fractions are generated in total. Specifically, the distillate from the first stage evaporation may be subjected to a second evaporation to provide at least one distillate fraction and at least one (further) residue fraction. Further, the residue from the first stage evaporation may be subjected to a second evaporation to provide at least one (further) distillate fraction and a residue fraction. The distillate of the present invention refers to at least one of the evaporation distillates (fractions) referred to above and may specifically be one of these fractions or a combination of two or more of these fractions.

If the evaporation process results in more than one distillate (distillate fraction), it is preferable that only a fraction of the distillate boiling at or above 100° C. under atmospheric pressure is forwarded to the hydrotreatment step. More preferably, only a fraction of the distillate boiling at or above 200° C., more preferably at or above 220° C., at or above 240° C., at or above 260° C., at or above 280° C., at or above 300° C., at or above 320° C., at or above 340° C., at or above 350° C., or at or above 360° C. under atmospheric pressure is forwarded to the hydrotreatment step. The reason for preferably using the high-boiling distillate fraction is that the lower-boiling fraction(s) can be easily processed to valuable components by other means than hydrotreatment and subsequent cracking. Thus, using only the higher-boiling distillate fraction increases the overall efficiency of the process.

The method of the present invention may further comprise a pre-treatment step of de-watering the recycled fossil-based feedstock. The pre-treatment step may be carried out before or after the heat-treatment step. It is, however, preferable to carry out the pre-treatment before the heat-treatment step. In view of efficiency, the de-watering step should not be carried out if the recycled fossil-based feedstock already contains a low amount of water.

De-watering may be achieved by any suitable chemical and/or physical method. For example, an absorbent or adsorbent for water may be contacted with the recycled fossil-based feedstock or water may be removed thermally by evaporation (distillation). The temperature during de-watering is preferably lower than in the evaporation step.

Further, it is preferably that de-watering is carried out at ambient pressure so as to keep processing equipment simple.

De-watering the recycled fossil-based feedstock allows better performance in subsequent steps, especially in the evaporation step. In particular, stable vacuum conditions can be achieved by removing water (and optionally further light components) before the evaporation steps.

The feed of the catalytic cracking step preferably comprises a biomass-based feed component in addition to the hydrotreated distillate. By combining the hydrotreated distillate from the recycled feed with a biomass-based feed, the method of the present invention can be even more sustainable. The recycled fossil-based feedstock, and even more the hydrotreated distillate produced therefrom, comprises mainly hydrocarbons (compounds consisting of carbon atoms and hydrogen atoms). This hydrotreated distillate can be combined with a biomass-based feed, which usually comprises a significant amount of oxygen-containing compounds, and thus the hydrotreated distillate can serve as a hydrogen source for oxygen removal in the catalytic cracking process.

By varying the ratio between hydrotreated distillate and biomass-based feed, the process can be finely adjusted.

Further, the feed of the catalytic cracking step may comprise a fossil feed component in addition to the hydrotreated distillate. The fossil feed may be a suitable feed other than the hydrotreated distillate. Specifically, the fossil feed may be a conventional cracking feed, such as vacuum gas oil (VGO).

By combining the hydrotreated distillate with another fossil feed, the catalytic cracking properties can be finely adjusted and the desired product distribution can be adjusted more easily. Preferably, the content of the hydrotreated distillate in the feed of the catalytic cracking step is 50 wt.-% or less, more preferably 40 wt.-% or less, 30 wt.-% or less or 20 wt.-% or less. In order to efficiently increase the use of recycled components, the content of the hydrotreated distillate in the feed of the catalytic cracking step is preferably 1 wt.-% or more, more preferably 2 wt.-% or more, 5 wt.-% or more or 8 wt.-% or more.

The method of the present invention may further comprise a step of removing insoluble components before performing catalytic cracking. The insoluble components include anything which is insoluble in the liquid phase subjected to the removing step, i.e. the (hydrotreated) distillate. More specifically, the insoluble components include particulate solids, precipitates, sludge, including (highly) viscous liquids which are immiscible with the liquid phase (the distillate or the hydrotreated distillate as the case may be). By reducing the content of insoluble components before hydrotreatment, the catalyst life can be prolonged and plugging can be avoided. By reducing the content of insoluble components before catalytic cracking, the fouling tendency may be even further reduced and the handling properties may be improved. The removal of insoluble components may be accomplished after de-watering, more preferably after heat treatment. Further, the insoluble components may be removed before and/or after hydrotreatment, preferably at least before hydrotreatment. Suitable methods for removing solids include, but are not limited to centrifugation, filtration and sedimentation.

On the other hand, solids usually accumulate in the evaporation residue so that a dedicated step of removing solid components is not always necessary or reasonable. Therefore, in view of procedural efficiency, the method of the present invention may be carried out without a dedicated step of removing solids.

In the method of the present invention, the heat treatment may be carried out prior to the evaporation step. In this case, the heat treatment is suitably carried out in a separate vessel (i.e. not in the vessel in which evaporation is carried out) and may be batch-wise or continuous. Such a procedure allows easy control of process conditions, in particular heating temperature and heating time.

Alternatively, or in addition, the heat treatment may be carried out as a part of the evaporation step.

If the heat treatment is carried out only as a part of the evaporate step, it is preferable that thin film evaporation is not used as the only evaporation technique.

It is also possible that the heat treatment is carried out both before and during evaporation (distillation).

If the heat treatment is carried out at least partly during the evaporation step, procedure can be simplified, which results in time saving and which requires less equipment.

The evaporation step is preferably carried out by distillation, e.g. in a distillation column or in a fractionation tower. By carrying out distillation as a rather slow evaporation process, the separation efficiency is improved and thus coke/fouling generating components will be removed with higher accuracy.

In the evaporation step, the maximum temperature is preferably 420° C. or less. The temperature is more preferably 410° C. or less, 400° C. or less, 380° C. or less, 360° C. or less, 340° C. or less, 320° C. or less, 310° C. or less, 300° C. or less, 290° C. or less or 280° C. or less.

If the heat treatment is carried out only as a part of the evaporation process, the maximum temperature in the evaporation step is preferably at least 250° C., at least 260° C., at least 270° C., at least 280° C., at least 290° C. or at least 300° C., at least 310° C. or at least 320° C. In this respect, the residence time and heating temperature can be easily adjusted by the heating conditions and the reflux ratio.

The evaporation step may be carried out using a fast evaporation apparatus, such as a thin film evaporator, a flash evaporator, a short path evaporator, a plate molecular still, or a falling film evaporator, especially when the heat treatment is carried out at least partially before the evaporation step. Such a fast evaporation apparatus allows high throughput with reasonable separation efficiency.

In the method of the present invention, it is preferable that no hydrogen gas is fed in the cracking step. This means that no hydrogen gas is intentionally added to the cracking stage. Of course, this does not exclude the presence of hydrogen gas which is formed as a consequence of the cracking procedure within the cracking reactor (in situ). The present invention can be carried out without the extra addition of hydrogen gas so that intentionally adding hydrogen is unnecessary and would only increase the complexity and thus the costs of the process.

In the present invention, the heating temperature during the heat treatment step is at least 290° C., more preferably at least 300° C., at least 310° C., at least 320° C., at least 330° C. at least 340° C., at least 350° C., at least 360° C., at least 370° C., at least 380° C., at least 390° C., at least 400° C., at least 410° C., at least 420° C., or at least 430° C. In this respect, balance between heating temperature and heating time (residence time) influences the efficiency of the method of the present invention. Generally, the lower the heat treatment temperature is, the longer should be the heat treatment time in order to achieve the best results.

It is particularly preferable that the heat treatment temperature is the highest temperature among all temperatures of the method of the present invention preceding the catalytic cracking step, specifically the highest temperature among the de-watering temperature, the heat treatment temperature and the (highest) evaporation temperature.

In the present invention, the heat treatment temperature refers to the temperature of the material to be treated (i.e. of the recycled fossil-based feedstock).

If the heat treatment temperature is at least 290° C., a considerable reduction of coke formation can be achieved. In this respect, although a reduction of coke formation can be achieved even at lower temperatures, this requires very long heating times which is not therefore not preferable. On the other hand, heat treatment temperatures of much more than 400° C. are usually not necessary to achieve the object of the present invention so that the heat treatment temperature is preferably 450° C. or less, more preferably 440° C. or less. The heat treatment temperature may further be 430° C. or less, 420° C. or less, 410° C. or less, 400° C. or less, 390° C. or less, 380° C. or less, 370° C. or less, or 360° C. or less.

The heat treatment duration (heat treatment time/residence time) influences the efficiency of the method of the present invention as well. Generally, the heat treatment step is carried out for at least 1 minute so as to achieve sufficient reduction of coke formation and further enable good process control. The heat treatment time is preferably at least 2 minutes, at least 5 minutes, at least 10 minutes, at least 20 minutes, at least 30 minutes, or at least 40 minutes. The heat treatment time may further be at least 50 minutes, at least 60 minutes, at least 80 minutes or at least 100 minutes. Generally, there is no upper limit for the heat treatment time. However, in view of process efficiency, the heat treatment time if preferably no upper limit 100 hours or less, more preferably 50 hours or less, 40 hours or less, 30 hours or less, 20 hours or less, 10 hours or less, or 5 hours or less.

If the heat treatment is carried out in a batch reactor, the heat treatment time corresponds to the temperature holding time. In a continuous reactor, the heat treatment time corresponds to the residence time.

Preferably, the heat treatment step is carried out at a pressure of 0.5 bar or more, more preferably 0.8 bar or more, 1.0 bar or more, 1.2 bar or more, 1.5 bar or more, 2.0 bar or more, 3.0 bar or more, 4.0 bar or more, 5.0 bar or more, 6.0 bar or more, 8.0 bar or more, 10.0 bar or more, 12.0 bar or more, or 14.0 bar or more. An elevated pressure during the heat treatment step can avoid the evaporation tendency and thus ensure an efficient heat treatment.

If not indicated to the contrary, a pressure referred to in the present invention means absolute pressure. The pressure above refer to the highest pressure occurring in the heat treatment step, i.e. measured at the point/time of highest pressure. In particular, it is preferably that the heat treatment is not carried out under reduced pressure, but rather under ambient pressure or elevated pressure. Specifically, higher pressure reduces the volatilisation tendency and thus possible product loss or boiling effects (in continuous processes).

The hydrotreatment step of the present invention serves to further remove harmful substances which could result in fouling, plugging or catalyst poisoning in the catalytic cracking step, or that could negatively affect the composition or the properties of the catalytic cracking products. The hydrotreatment step is a step of contacting the distillate with hydrogen, preferably in the presence of a preferably solid hydrogenation catalyst. The hydrotreatment may be employ any known catalyst or method and is particularly preferably at least a hydrodesulphurisation (HDS) treatment. Further reactions (in addition to or instead of HDS) which may take place during hydrotreatment can include hydrodenitrogenation (HDN), hydrodeoxygenation (HDO), hydrodechlorination (HDCI) and/or hydrogenation of olefins and/or aromatics. Removal of heteroatoms via the aforementioned HDS, HDN, HDO and HDCI reactions can be especially beneficial in situations where post-FCC gasoline and/or middle distillate HDS is not carried out.

The method of the present invention further preferably comprises a step of fractionating the catalytic cracking product (the product of the cracking step). Fractionation can be carried out with any known means and preferably results in the production of at least a gasoline range fraction and a middle distillate range fraction.

In the present invention, the type of catalytic cracking is not particularly limited and may be any known type, such as thermal catalytic cracking (TCC), fluid catalytic cracking (FCC), fluidized bed catalytic cracking, transported bed catalytic cracking, moving bed catalytic cracking, or fixed bed catalytic cracking.

The cracking temperature is not particularly limited and any suitable temperature may be employed. Specifically, a temperature within the range of 450° C. to 650° C. may be employed. The cracking temperature is preferably 470° C. or more, 490° C. or more, 500° C. or more, or 510° C. or more. Further, the cracking temperature is preferably 620° C. or less, 600° C. or less, 580° C. or less, 560° C. or less, 550° C. or less, or 540° C. or less.

The catalyst-to-oil ratio (amount of catalyst/total amount of cracking feed) is not particularly limited either. A preferable catalyst-to-oil ratio is in the range of from 1.0 to 2000.0. The catalyst-to-oil ratio is more preferably at least 1.5, at least 2.0, at least 3.0, at least 4.0, at least 5.0, at least 7.0, at least 10.0, at least 15.0 or at least 20.0. Further, the catalyst-to-oil ratio is preferably 800.0 or less, 600.0 or less, 500.0 or less, 400.0 or less, 300.0 or less, 200.0 or less or 100.0 or less.

Figure 1:
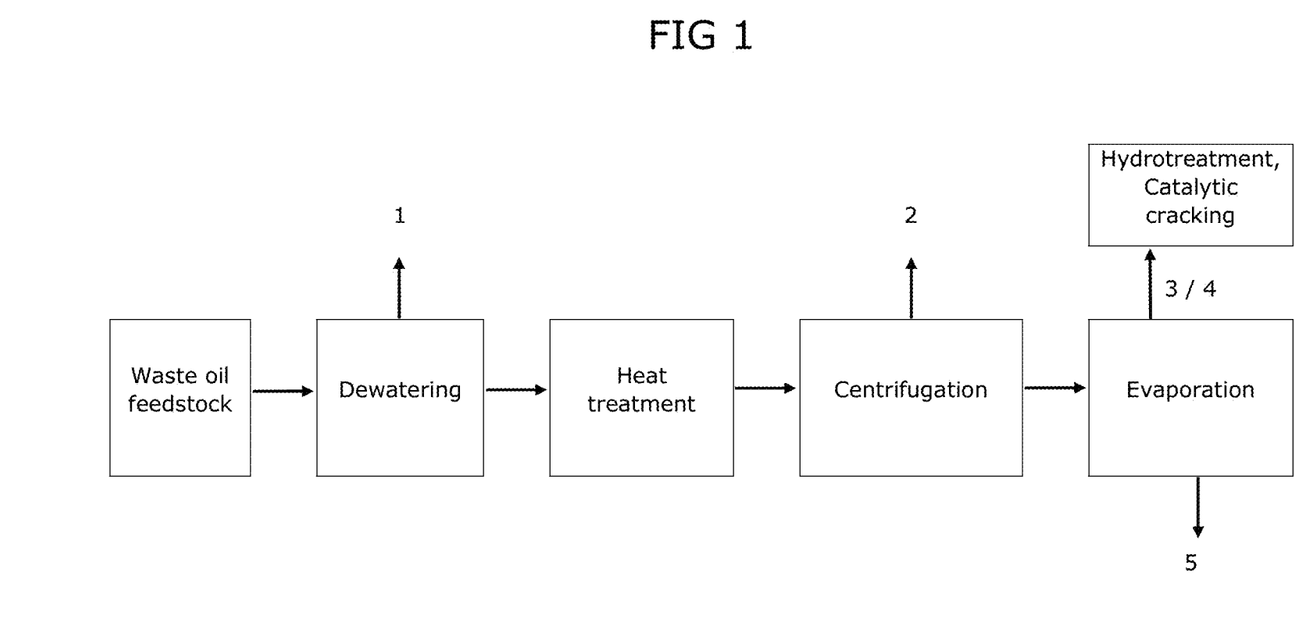
FIG. 1 is an exemplary flow chart of a procedure as disclosed herein.

The procedure of the present invention is schematically shown in FIG. 1. As illustrated in FIG. 1, water (1) may be removed in a de-watering step, insoluble components (2) may be removed e.g. in a centrifugation step, and distillation residue (5) is removed in an evaporation step, e.g. in a thin film evaporator. At least one of the distillate fractions (3 and 4) is then forwarded to hydrotreatment and subsequently to catalytic cracking.

The present invention further relates to a fuel component obtainable by the method of the present invention.

As can be seen from the results of the Examples (and in particular from FIGS. 2 and 3), the method of the present invention enables efficient production of high-value fuel components, especially in the gasoline and middle distillate range.

The fuel is preferably a fuel component comprising a fraction of the cracking product, wherein the fraction is preferably a fraction boiling in the gasoline range, or a fraction boiling in the middle distillate range.

The present invention further relates to a use of a cracking product or of a fraction thereof obtained by the method of the present invention for producing a fuel or a fuel component.

EXAMPLES

The present invention is further illustrated by way of Examples. However, it is to be noted that the invention is not intended to be limited to the exemplary embodiments presented in the Examples.

Example 1

Two waste oil samples obtained from commercial sources were pre-treated according to the procedure that is described herein. The waste oil was de-watered in a rotary evaporator at 80 mbar and 100° C. oil bath temperature.

Water and minor amounts of light residues were distilled off and discarded while the residue after de-watering was fed to a batch reactor for heat treatment. The batch reactor was heated up to 320° C. and this temperature was maintained for 1 hour. During this time, the batch reactor remained closed and the pressure inside the batch reactor increased up to about 13 bar.

The thus heat-treated waste oil was subjected to centrifugation at 4300 rpm and 50° C. for 30 minutes. The solids/sludge and entrained oil obtained from centrifugation were discarded and the supernatant was subjected to a two-stage thin film evaporation (TFE) under reduced pressure.

In the first stage, which was performed at approximately 135° C. and 0.5 mbar pressure, a distillate fraction boiling at or below 360° C. (at normal pressure) was obtained. The residue, i.e. the evaporation bottoms, from the first stage was subjected to another evaporation step at approximately 280° C. and 0.1 mbar. This resulted in a second distillate fraction with an approximate boiling point range of 360-560° C. (at normal pressure), as well as a residue (distillation bottoms). The second distillate fraction was further used as a feedstock in catalytic cracking experiments whereas the residue was discarded.

The catalytic cracking experiments were carried out in a fixed bed reactor which is originally based on the ASTM D3907 standard. The catalytic cracking was carried out in a reactor filled with 30 g zeolite-containing solid acid catalyst (apparent bulk density: 1050 kg/m$^3$, catalyst particle size: 5-20 mm) and was driven batch-wise using 10 g feed (catalyst-to-oil ratio 3) at 500° C. using a cracking time of 15 min per each 10 g batch. After each batch, the catalyst was regenerated by combustion of formed coke. The amount of CO and $CO_2$ formed by combustion during the regeneration was used as a measure of the amount of coke formation. Further, the product fraction (liquid product) of the cracking unit was analysed by simulated distillation to determine the boiling point distribution of the hydrocarbons.

Figure 2:
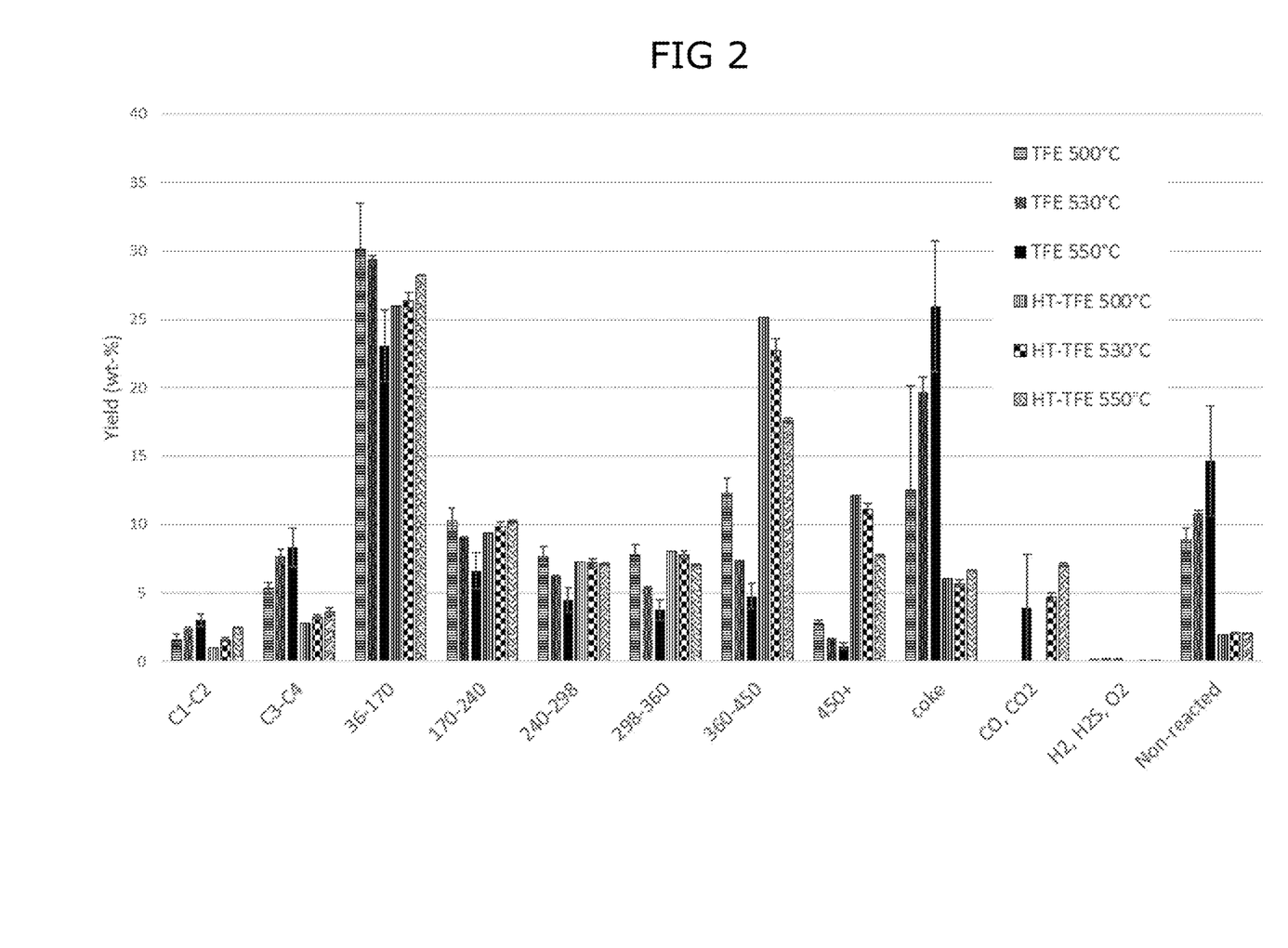
FIGS. 2 and 3 are exemplary results of implementing a method as disclosed herein.

The cracking procedure was repeated twice for both waste oil samples, and the average value from the two repetitions was used for evaluation. The results are shown in FIG. 2 (waste oil #1) and FIG. 3 (waste oil #2) and in Table 1. The data series denoted 'HT-TFE-500° C.' refers to the results of Example 1.

Example 2

The temperature in the catalytic cracking step was increased to 530° C. Except for this, the procedure of Example 1 was repeated. The data series denoted 'HT-TFE-530° C.' refers to the results of Example 2.

Example 3

The temperature in the catalytic cracking step was increased to 550° C. Except for this, the procedure of Example 1 was repeated. The data series denoted 'HT-TFE-550° C.' refers to the results of Example 3.

Comparative Example 1

The procedure of Example 1 was repeated, except that the heat treatment step was omitted. That is, the de-watered waste oil was directly subjected to centrifugation without the heat treatment step and evaporation was carried out after centrifugation. The data series denoted 'TFE-500° C.' refers to the results of Comparative Example 1.

Comparative Example 2

The temperature in the catalytic cracking step was increased to 530° C. Except for this, the procedure of Comparative Example 1 was used. The data series denoted 'TFE-530° C.' refers to the results of Comparative Example 2.

Comparative Example 3

The temperature in the catalytic cracking step was increased to 550° C. Except for this, the procedure of Comparative Example 1 was used. The data series denoted 'TFE-550° C.' refers to the results of Comparative Example 3.

TABLE 1

|  | Heat treatment | Cracking temp. | Coke yield (waste oil #1) | Unreacted material (waste oil #1) | Coke yield (waste oil #2) | Unreacted material (waste oil #2) |
| --- | --- | --- | --- | --- | --- | --- |
| Example 1 | 320° C./1 h | 500° C. | 6 wt.-% | 2 wt.-% | 5 wt.-% | 2 wt.-% |
| Example 2 | 320° C./1 h | 530° C. | 6 wt.-% | 2 wt.-% | 5 wt.-% | 2 wt.-% |
| Example 3 | 320° C./1 h | 550° C. | 7 wt.-% | 2 wt.-% | 6 wt.-% | 2 wt.-% |
| Comparative Example 1 | none | 500° C. | 12 wt.-% | 9 wt.-% | 19 wt.-% | 11 wt.-% |
| Comparative Example 2 | none | 530° C. | 20 wt.-% | 11 wt.-% | 18 wt.-% | 11 wt.-% |
| Comparative Example 3 | none | 550° C. | 26 wt.-% | 15 wt.-% | 15 wt.-% | 11 wt.-% |

Figure 3:
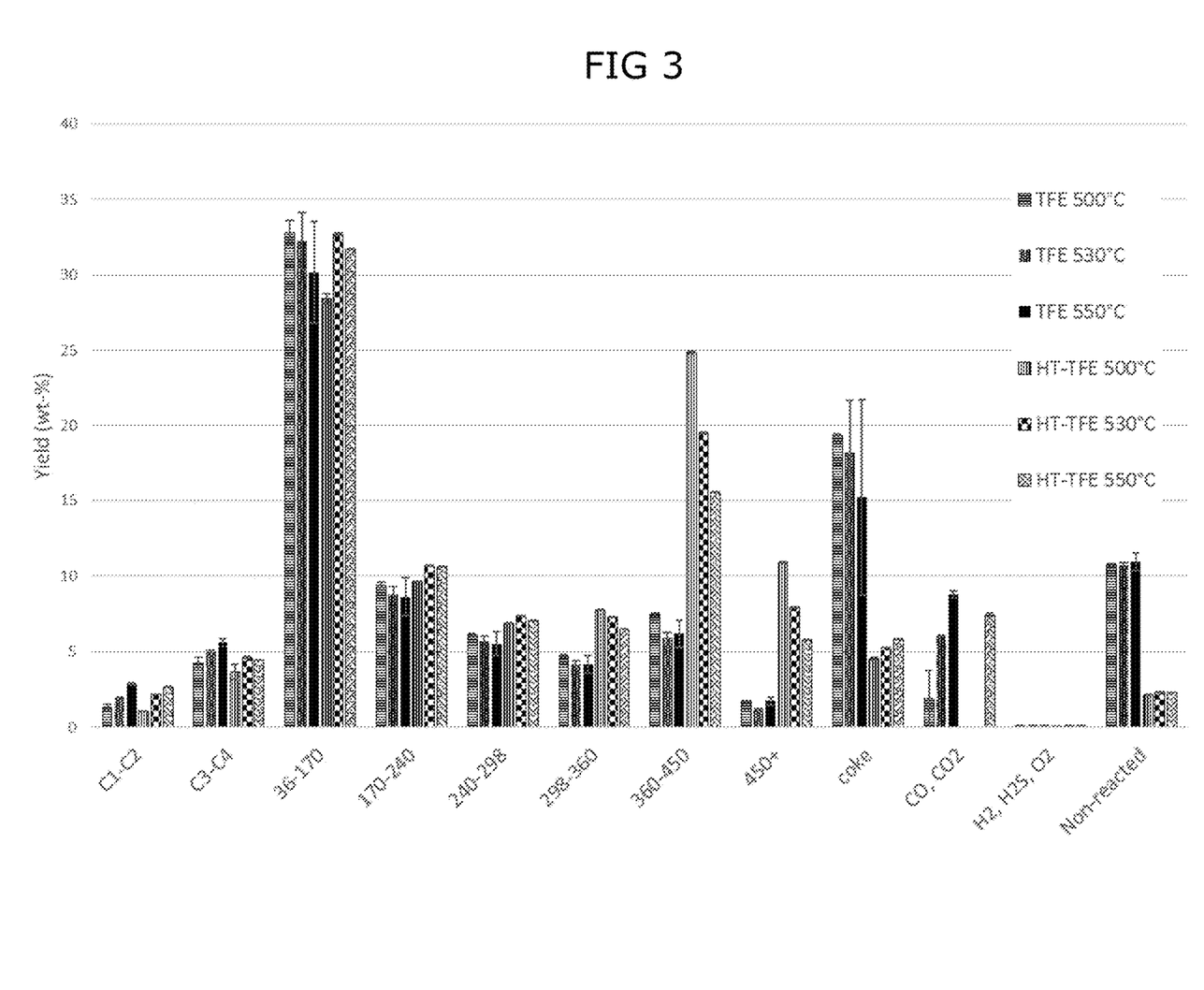

As can be seen from the results of FIGS. 2 and 3 and from Table 1, coke formation is significantly reduced when employing a heat treatment step before the evaporation step. In addition, the amount of non-reacted material in the catalytic cracking procedure is reduced when employing the heat treatment step. A further improvement of the catalytic cracking product is achieved by hydrotreating the distillate after evaporation and before catalytic cracking.

Therefore, the combined use of heat-treatment and evaporation allows a significant improvement of cracking efficiency and cracking catalyst life (reduced coking).

The invention claimed is:

1. A method of producing a cracking product, the method comprising:
    subjecting a recycled fossil-based feedstock containing metallic impurities and reactive components to a heat treatment;
    evaporating the heat-treated feedstock to produce distillate(s) and a residue fraction containing reacted metallic impurities of the recycled fossil-based feedstock;
    hydrotreating a fraction of the distillate(s) boiling at or above 100° C. to produce a hydrotreated distillate; and
    performing catalytic cracking of the hydrotreated distillate as a feed component of a feed in a presence of a solid acid catalyst;
    wherein a heating temperature during the heat treatment is at least 290° C. and wherein the heat treatment is carried out for at least 1 minute,
    wherein the heat treatment is carried out at a pressure of 2.0 bar or more,
    wherein a cracking temperature is 510° C. or more; and
    wherein the feed of the catalytic cracking comprises: a biomass-based feed component in addition to the hydrotreated distillate.

2. The method according to claim 1, comprising:
    a pre-treatment of de-watering the recycled fossil-based feedstock.

3. The method according to claim 1, wherein the heat treatment is carried out prior to the evaporating.

4. The method according to claim 1, wherein the heat treatment is carried out as a part of the evaporating.

5. The method according to claim 1, wherein the evaporating is carried out by distillation in at least one of a distillation column or in a fractionation tower.

6. The method according to claim 1, wherein the evaporating is carried out in a fast evaporation apparatus, configured as at least one of a thin film evaporator, a flash evaporator, a short path evaporator, a plate molecular still, or a falling film evaporator.

7. The method according to claim 1, wherein no hydrogen gas is fed in when performing the cracking.

8. The method according to claim 1, wherein the heating temperature during the heat treatment is at least one of at least 300° C., at least 310° C., at least 320° C. or at least 330° C.

9. The method according to claim 1, wherein the heat treatment is carried out for at least one of at least 2 minutes, at least 5 minutes, at least 10 minutes, at least 20 minutes, at least 30 minutes, at least 40 minutes, at least 50 minutes, at least 60 minutes, at least 80 minutes or at least 100 minutes.

10. The method according to claim 1, wherein the heat treatment is carried out at a pressure of 3.0 bar or more.

11. The method according to claim 1, comprising:
    for producing a fuel or a fuel component from at least a fraction of the cracking product.

12. The method according to claim 1, wherein the feed of the catalytic cracking comprises:
    a fossil feed component in addition to the hydrotreated distillate and the biomass-based feed component.

13. The method according to claim 12, wherein the heat treatment is carried out prior to the evaporating.

14. The method according to claim 12, wherein the heat treatment is carried out as a part of the evaporating.

15. The method according to claim 14, wherein the evaporating is carried out by distillation in at least one of a distillation column or in a fractionation tower.

16. The method according to claim 1, wherein the heat treatment is carried out continuously prior to the evaporation step in a separate vessel, and/or in addition the heat treatment is carried out at least partly during the evaporation step.

17. The method according to claim 1, wherein the evaporation step is carried out in more than one stage so that at least three fractions are generated in total.

18. The method according to claim 1, wherein the distillate(s) from the evaporation step are subjected to a second evaporation step to provide at least one distillate fraction and at least one further residue fraction.

* * * * *